United States Patent
Goto et al.

(10) Patent No.: US 8,260,309 B2
(45) Date of Patent: Sep. 4, 2012

(54) TRANSMISSION RATE CONTROL METHOD AND RADIO BASE STATION

(75) Inventors: Yoshikazu Goto, Yokohama (JP);
Akihito Hanaki, Yokohama (JP);
Takahiro Hayashi, Yokosuka (JP);
Junichiro Kawamoto, Tokyo (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 788 days.

(21) Appl. No.: 12/357,494

(22) Filed: Jan. 22, 2009

(65) Prior Publication Data

US 2009/0191887 A1    Jul. 30, 2009

(30) Foreign Application Priority Data

Jan. 24, 2008 (JP) ................. P2008-014018

(51) Int. Cl.
*H04W 72/00* (2009.01)

(52) U.S. Cl. .................. 455/450; 455/451; 455/452.2; 370/468

(58) Field of Classification Search ............ 455/450, 455/452.2
See application file for complete search history.

(56) References Cited

U.S. PATENT DOCUMENTS

| | | | |
|---|---|---|---|
| 7,630,733 B2 | 12/2009 | Usuda et al. | |
| 2005/0163056 A1* | 7/2005 | Ranta-Aho et al. | 370/252 |
| 2007/0047451 A1* | 3/2007 | Lohr et al. | 370/242 |
| 2007/0293203 A1 | 12/2007 | Usuda et al. | |
| 2008/0139133 A1 | 6/2008 | Usuda et al. | |
| 2008/0192635 A1 | 8/2008 | Usuda et al. | |
| 2009/0093218 A1 | 4/2009 | Umesh et al. | |

FOREIGN PATENT DOCUMENTS

| | | |
|---|---|---|
| CN | 1829388 A | 9/2006 |
| CN | 101023698 A | 8/2007 |
| JP | 2006-279910 A | 10/2006 |
| JP | 2007-019835 A | 1/2007 |
| JP | 2007-517431 A | 6/2007 |
| JP | 2008-182734 A | 8/2008 |
| WO | 2005/079139 A2 | 9/2005 |

(Continued)

OTHER PUBLICATIONS

The Chinese office action issued on Jul. 29, 2011 in the counterpart Chinese patent application.

(Continued)

*Primary Examiner* — Jean Gelin
*Assistant Examiner* — Amanuel Lebassi
(74) *Attorney, Agent, or Firm* — Marvin A. Motsenbocker; Mots Law, PLLC

(57) ABSTRACT

A transmission rate control method according to the present invention includes: determining, at the radio base station NodeB, a maximum granted value that can be notified to the mobile station UE, in accordance with a throughput at which the uplink user data transmitted from the mobile station UE to the radio base station NodeB is successfully received at a point of time; calculating, at the radio base station NodeB, as an allowable value to be notified to the mobile station UE, a granted value not more than the maximum granted value; notifying, from the radio base station NodeB to the mobile station UE, the granted value calculated at the radio base station NodeB, by using a transmission rate control channel; and transmitting, from the mobile station UE, the uplink user data, at the transmission rate corresponding to the granted value notified from the radio base station NodeB.

10 Claims, 12 Drawing Sheets

FOREIGN PATENT DOCUMENTS

| WO | 2005/112296 A2 | 11/2005 |
|----|----------------|---------|
| WO | 2006/095871 A1 | 9/2006  |
| WO | 2006/104209 A1 | 10/2006 |
| WO | 2006/118303 A1 | 11/2006 |

OTHER PUBLICATIONS

3GPP TS 25.321 V7.5.0 (Jun. 2007), 3rd Generation Partnership Project; Technical Specification Group Radio Access Network; Medium Access Control (MAC) protocol specification (Release 7), 141 pages.

3GPP TS 25.212 V7.0.0 (Mar. 2006), 3rd Generation Partnership Project; Technical Specification Group Radio Access Network; Multiplexing and channel coding (FDD) (Release 7), 84 pages.

Extended European Search Report issued on Jul. 22, 2011 in the counterpart European patent application.

Motorola; "Method for Node B Controlled Time and Rate Limit (Explicit) Scheduling"; Enhanced Uplink DCH; TSG-RAN WG 1 #32 meeting; Paris, France (May 19-23, 2003).

NTT DoCoMo; "Autonomous Rate Ramping for Common Rate Control"; TSG-RAN Working Group 1 # 38bis; Soul, Korea (Sep. 20-24, 2004).

* cited by examiner

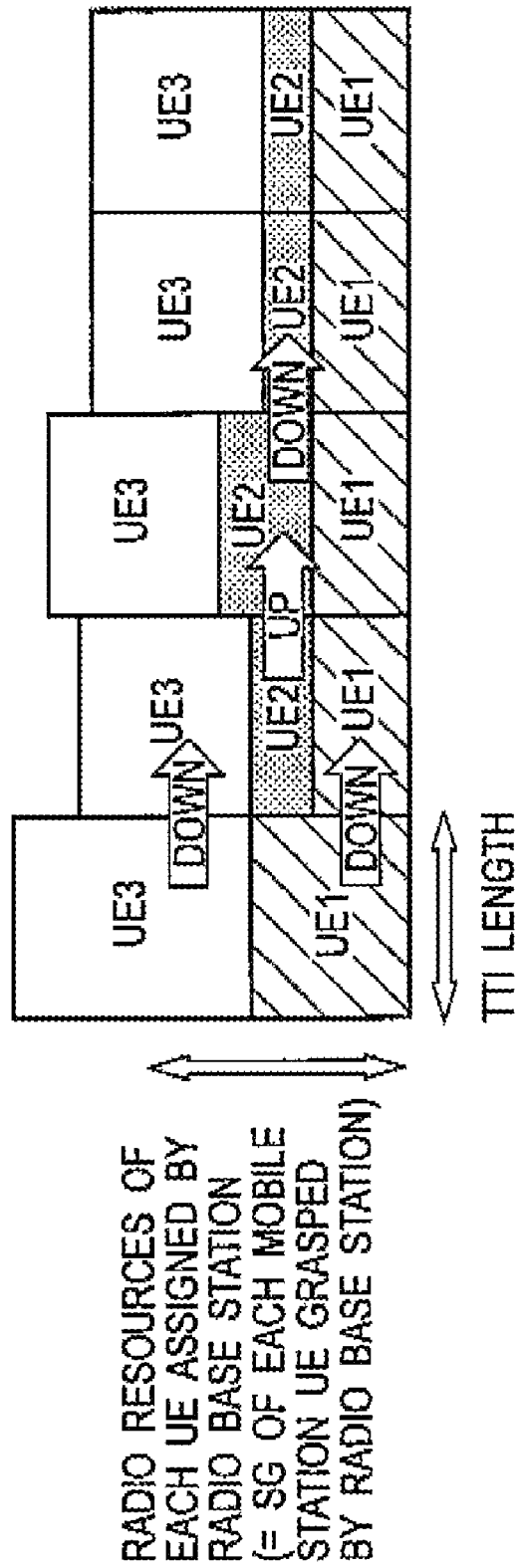

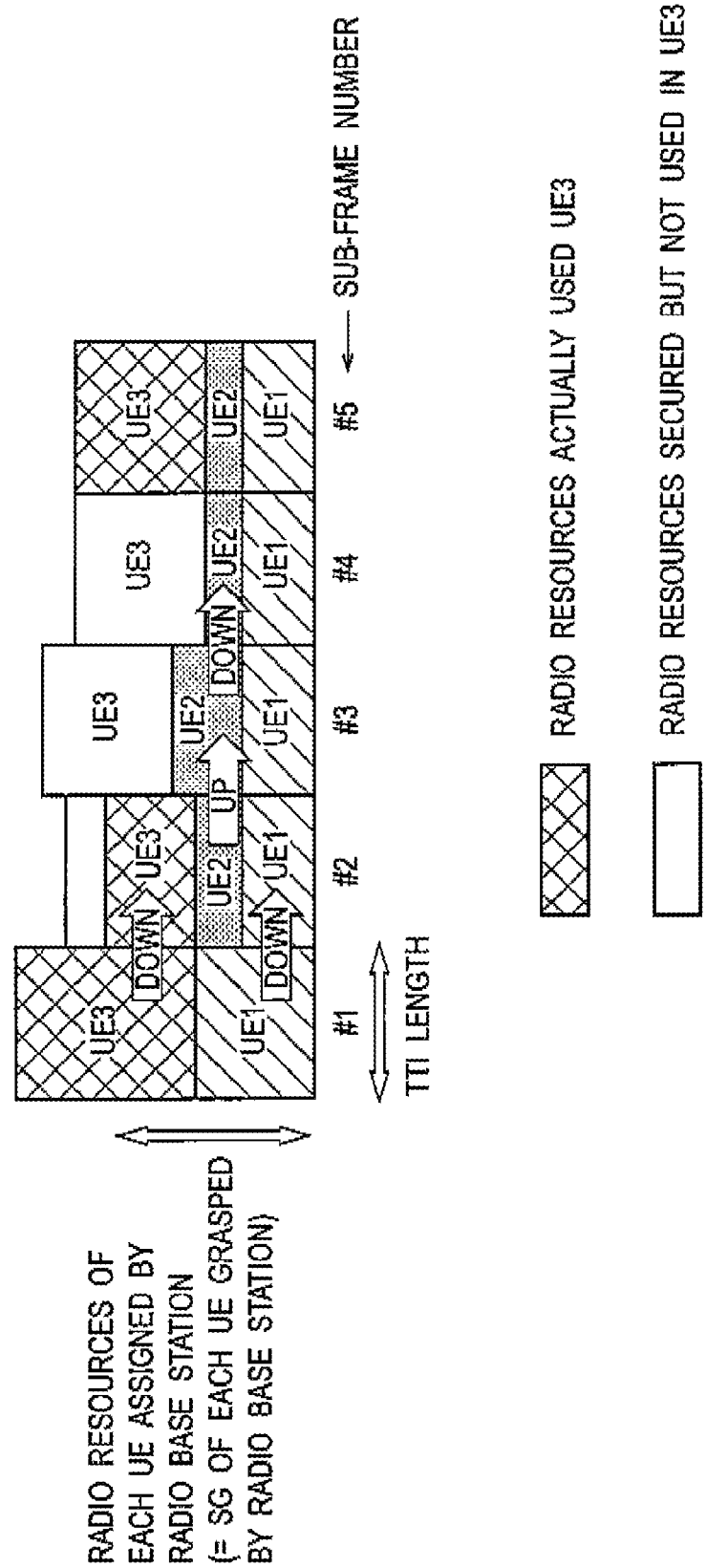

| SUCCESSFULLY RECEIVED TRANSMISSION RATE | MAXIMUM AG VALUE |
|---|---|
| 100Kbps | $(15/15)^2$ |
| 300Kbps | $(24/15)^2$ |
| 1Mbps | $(30/15)^2$ |
| ⋮ | ⋮ |
| 5Mbps | $(150/15)^2 \times 6$ |

FIG. 7

| AG | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT * | 1 |
| INACTIVE * | 0 |

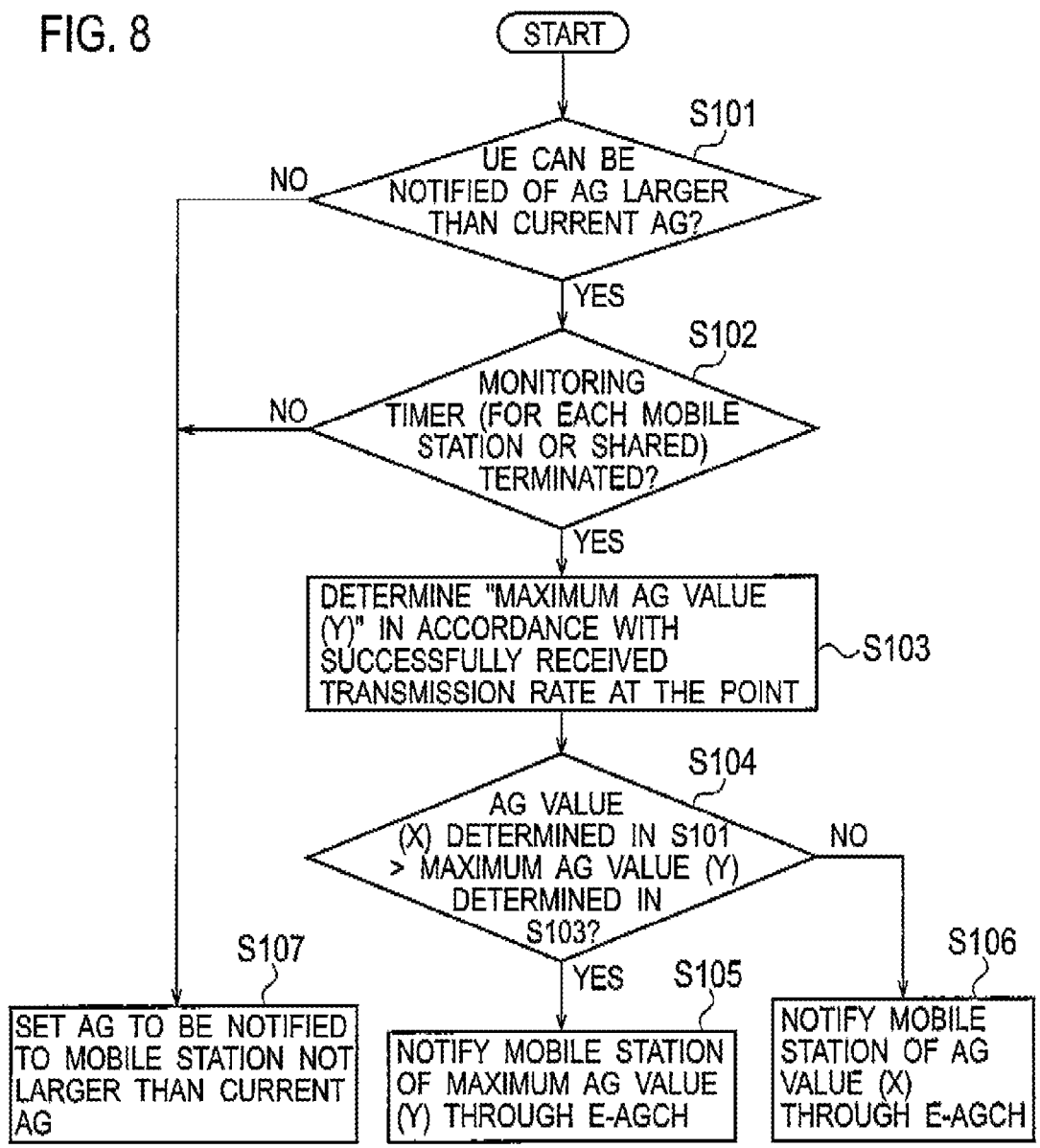

FIG. 10

| SUCCESSFULLY RECEIVED TRANSMISSION RATE | MAXIMUM ALLOWABLE INCREMENT OF AG |
|---|---|
| 100Kbps | 0 |
| 300Kbps | 0 |
| 1Mbps | 4 |
| ⋮ | ⋮ |
| 5Mbps | 8 |

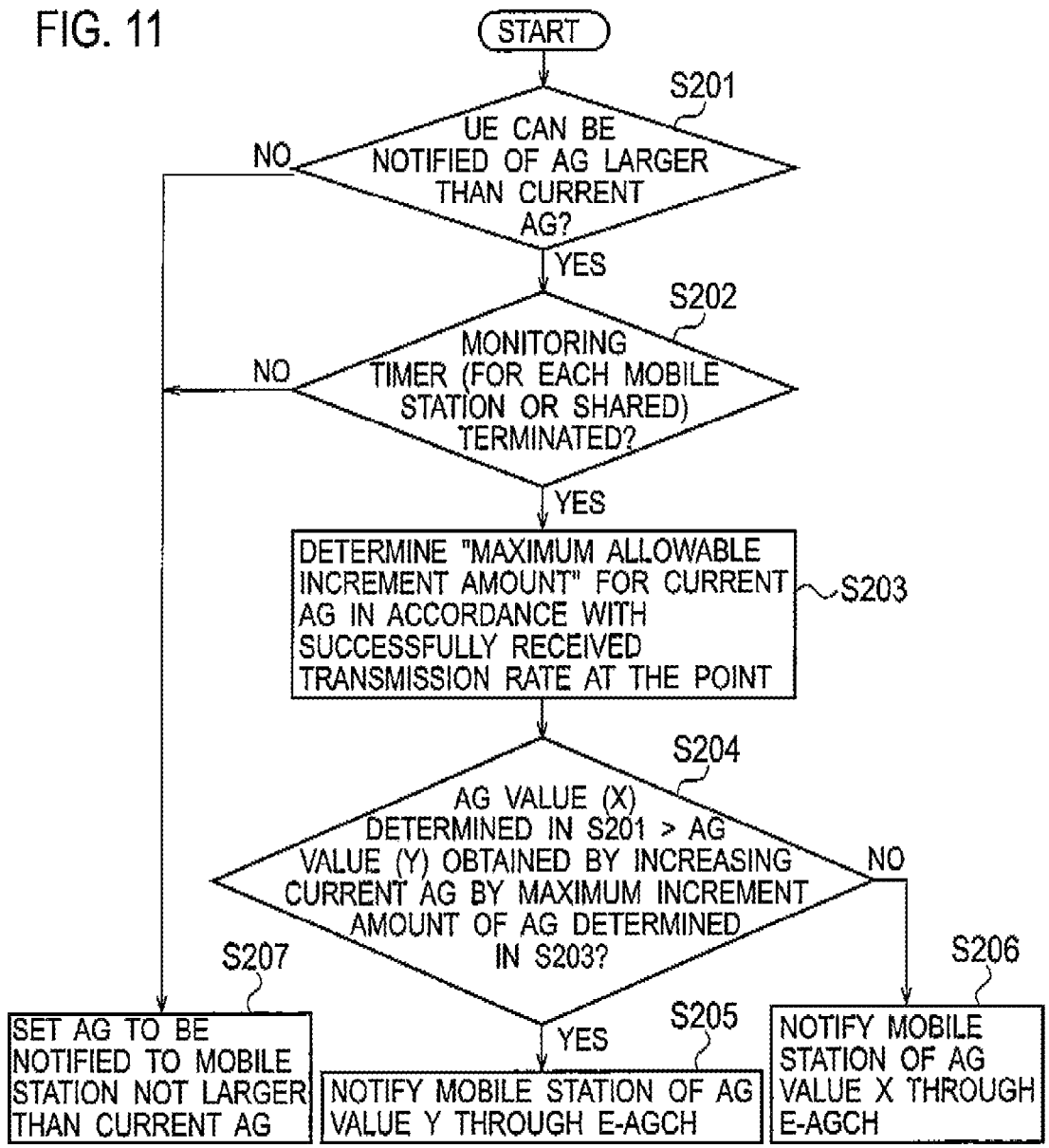

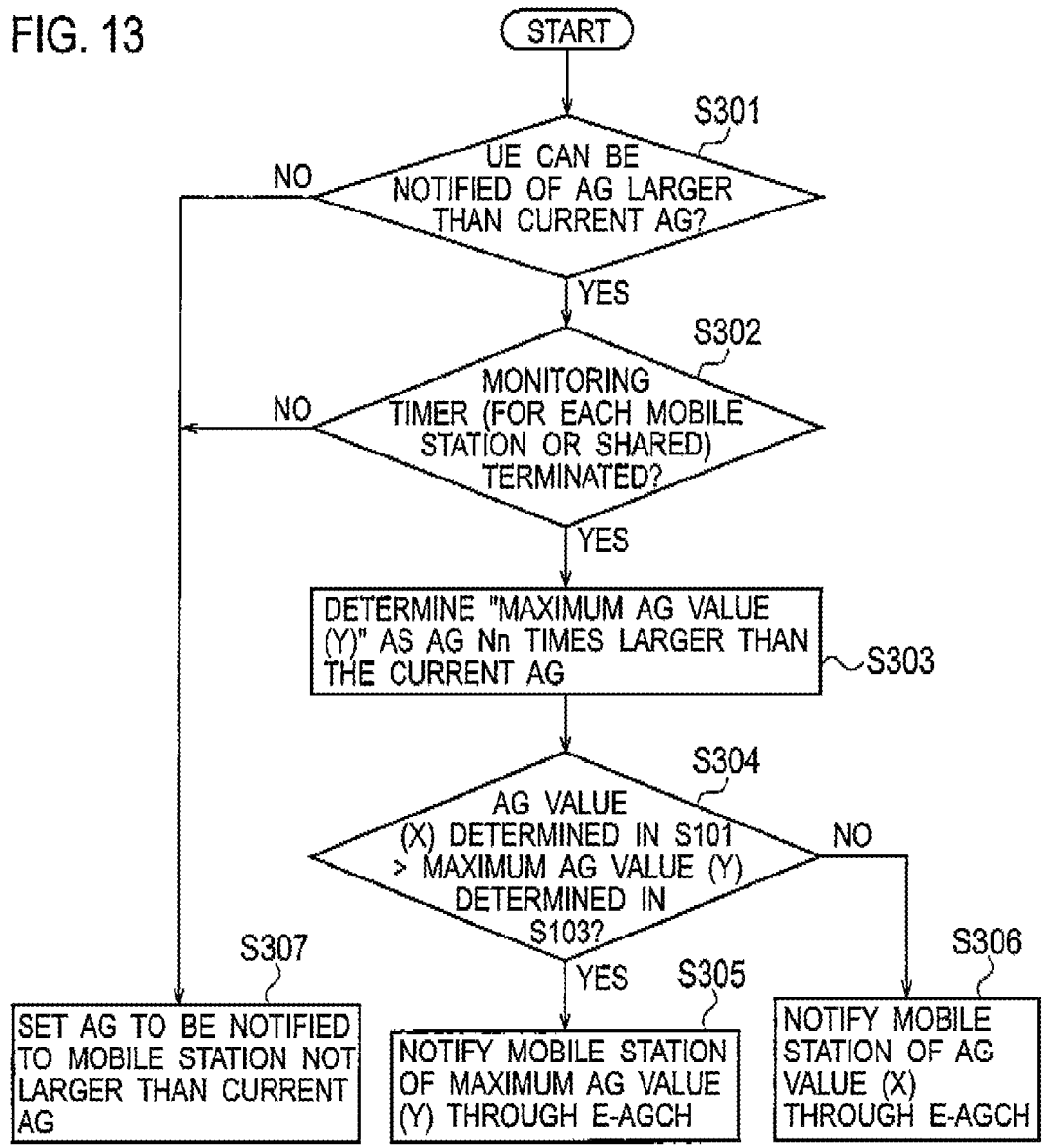

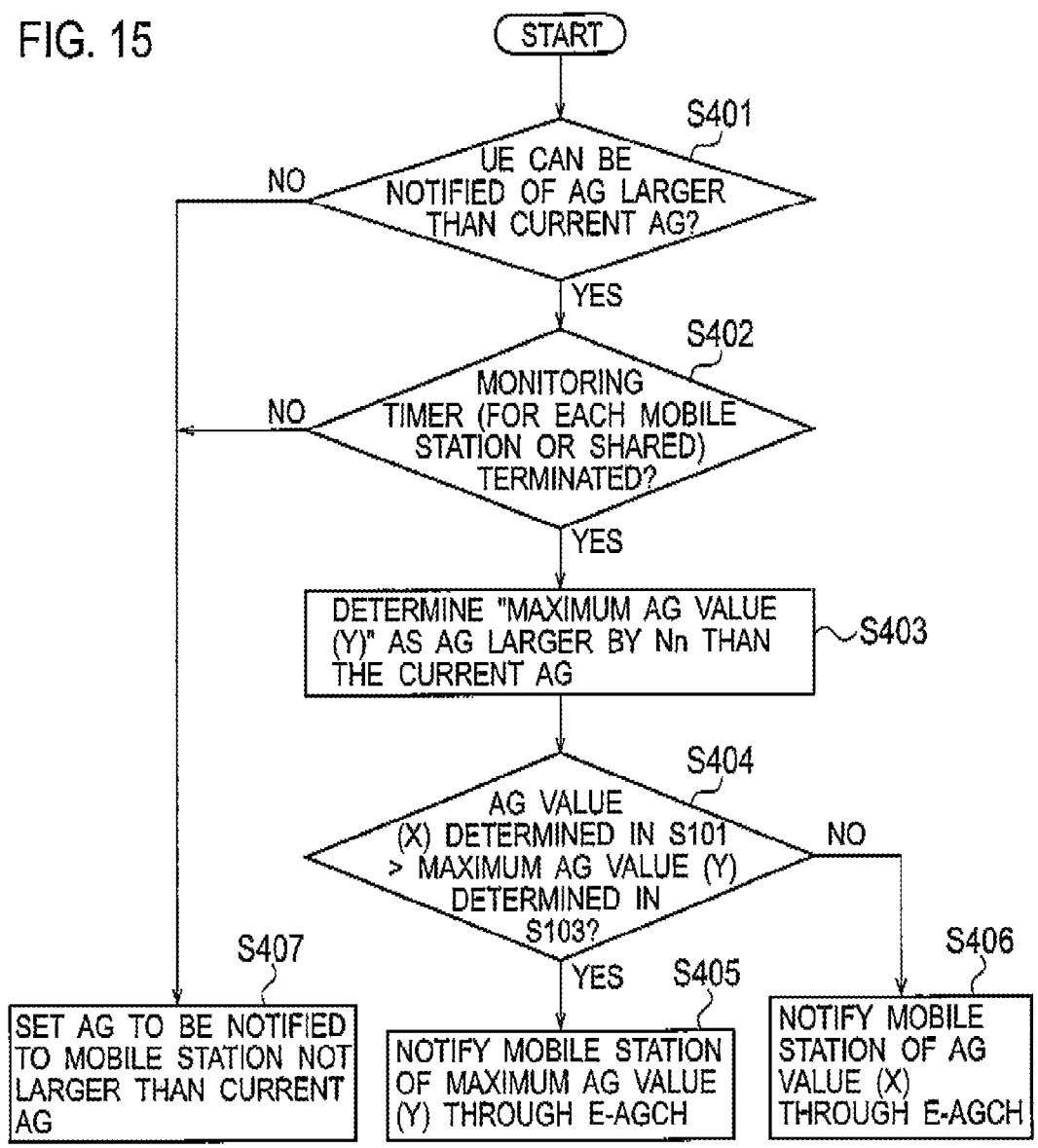

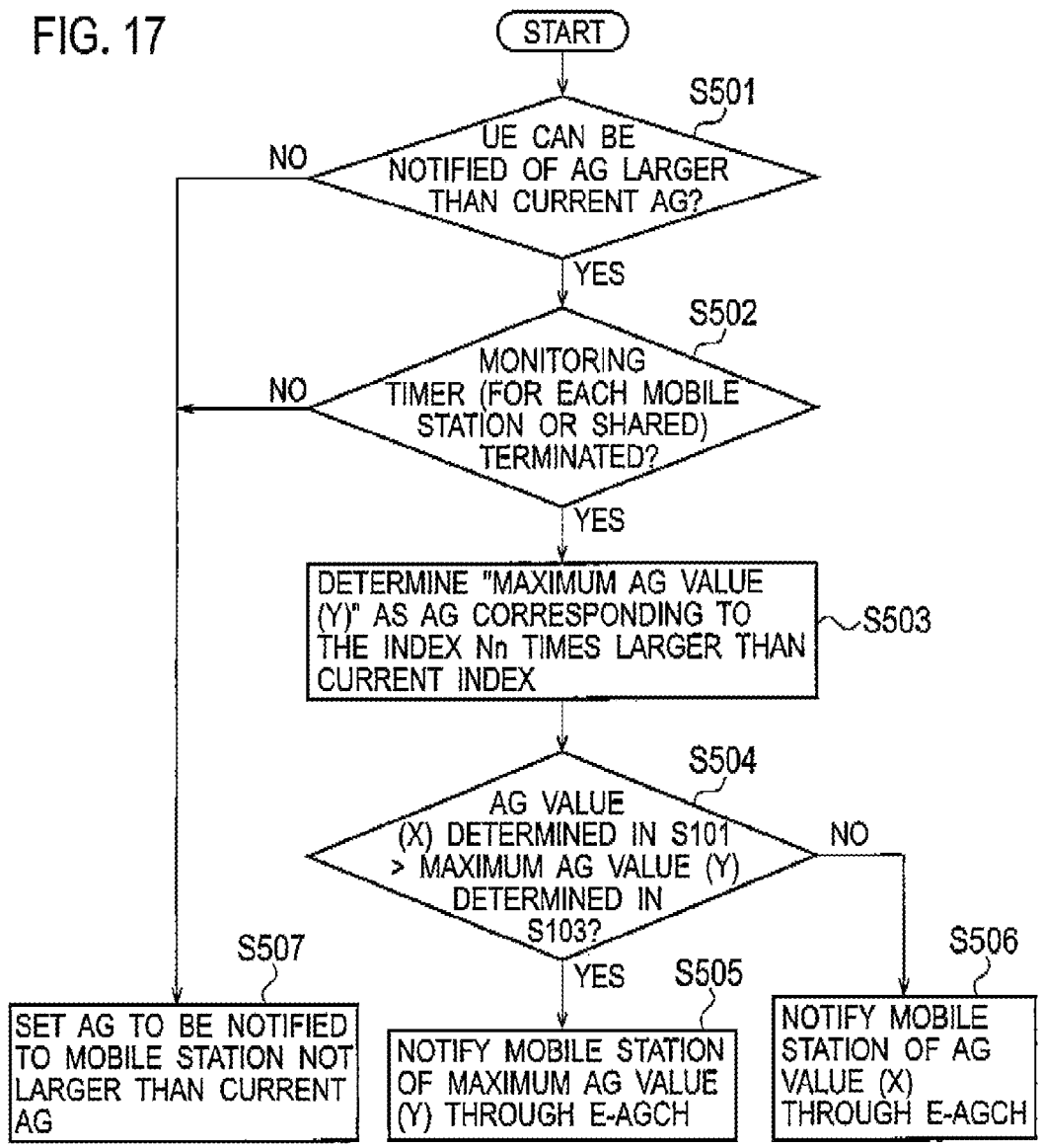

TRANSMISSION RATE CONTROL METHOD AND RADIO BASE STATION

CROSS REFERENCE TO RELATED APPLICATION

This application is based upon and claims the benefit of priority from prior Japanese Patent Application No. 2008-014018, filed on Jan. 24, 2008; the entire contents of which are incorporated herein by reference.

BACKGROUND OF THE INVENTION

1. Field of the Invention

The present invention relates to a transmission rate control method, a mobile communication system and a radio base station, which controls a transmission rate of uplink user data to be transmitted from a mobile station.

2. Description of the Related Art

In a conventional mobile communication system, when setting a dedicated channel, a radio network controller is configured to determine a transmission rate of uplink user data, in consideration of a radio resource of a radio base station, an amount of an interference in the uplink, a transmission power of a mobile station, a transmission processing performance of the mobile station, a transmission rate required for an upper application, and the like; and to notify the determined transmission rate of the uplink user data by a layer 3 (radio resource control layer) message to both of the mobile station and the radio base station.

Here, the radio network controller is provided at an upper level of the radio base station, and is an apparatus configured to control the radio base station and the mobile station.

In general, data communications often cause burst traffic compared with voice communications or TV communications. Therefore, it is preferable that a transmission rate of a channel used for the data communications is changed fast.

However, as shown in FIG. 1, a radio network controller integrally controls a plurality of radio base stations in general. Therefore, in the conventional mobile communication system, there has been a problem that it is difficult to perform fast control for changing the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even when the fast control for changing of the transmission rate of the uplink user data can be performed.

Accordingly, in the conventional mobile communication system, when burst data transmission is performed as shown in FIG. 2A, the data are transmitted by accepting low-speed, high-delay, and low-transmission efficiency as shown in FIG. 2B, or by reserving radio resources for high-speed communications so as to accept the radio bandwidth resources in an unoccupied state and hardware resources in the radio base station Node B are wasted, as shown in FIG. 2C.

In each of FIGS. 2B and 2C, "radio resource" on the vertical axis refers to both of the radio band resource and the hardware resource mentioned above. Hereinafter, a radio band resource and a hardware resource are collectively referred to as a "radio resource".

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2), between the radio base station Node B and the mobile station UE, so as to utilize the uplink radio resources effectively. Such discussions or discussed functions will be hereinafter referred to as "Enhanced Uplink (EUL)".

Hereinbelow, an example will be given for a control method of a radio resource (i.e., a transmission rate of uplink user data) for transmitting the uplink user data, which has been discussed in the "enhanced uplink".

In this control method, a radio base station NodeB is configured to assign, so to each of mobile stations UE, a radio resource to be used for transmitting the uplink user data for the mobile station UE at a predetermined timing (TTI: transmission time interval).

Here, the radio base station NodeB is configured to notify, to each of the mobile stations UE by using an enhanced absolute grant channel (E-AGCH), an absolute grant (AG) corresponding to the radio resource to be assigned to each of the mobile stations UE.

The radio base station NodeB is also configured to notify, to each of the mobile stations UE, a relative grant (RG), which indicates changes (UP/DOWN/HOLD) in a transmission rate of the uplink user data corresponding to the radio resource assigned to each of the mobile stations UE. The radio base station NodeB transmits the RG by use of an enhanced-relative grant channel (E-RGCH).

Specifically, as shown in FIG. 3, the radio base station NodeB is configured to notify, to each of the mobile stations UE1 to UE3, an SG corresponding to the radio resources assigned to each of the mobile stations UE1 to UE3, by use of an AG (granted value) or an RG (UP/DOWN/HOLD) through the E-AGCH or the E-RGCH.

Note that, in each TTI (sub-frame), the radio base station NodeB is configured to send a notification of the AG or the RG only to the mobile station allowed to transmit the uplink user data through an enhanced-dedicated physical data channel (E-DPDCH).

Here, when the mobile stations UE1 to UE3 are not notified of the AG nor the RG, the mobile stations UE1 to UE3 continuously use the current SG. Note that, in a general mobile communication system, the SG assigned to the mobile stations UE1 to UE3 is set to be the same value for a period of several 10 ms to several 100 ms, in many cases.

A related technique is disclosed in Japanese Patent Publication No. 2007-517431.

However, the mobile communication system employing the "EUL" method as described above has the following problem. Detailed description will be given by referring to FIG. 4. In the mobile station UE3 of FIG. 4, transmission of uplink user data is completed in the sub-frame #2, and assigned radio resources are not used in the sub-frame #3 and #4. Thereafter, uplink user data to be transmitted is generated again in the sub-frame #5. In such case, a transmission power for transmitting an E-DPDCH from the mobile station UE is drastically increased during switching from the sub-frame #4 to the sub-frame #5. Accordingly, reception characteristics of the radio base station NodeB are deteriorated. Moreover, the dispersion of a received total wideband power (RTWP) measured at the radio base station NodeB is increased; thereby a measurement error becomes large.

Moreover, the radio resources assigned to the mobile station UE3 in the sub-frames #3 and #4 are excessive, and these radio resources are wasted since these radio resources cannot be used by the mobile stations UE1 and UE2.

SUMMARY OF THE INVENTION

A first aspect of the present invention is summarized as a transmission rate control method in which a radio base station controls a transmission rate of uplink user data to be transmitted from a mobile station, including: determining, at the radio base station, a maximum granted value that can be notified to the mobile station, in accordance with a throughput at which the uplink user data transmitted from the mobile station to the radio base station is successfully received at a point of time; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

A second aspect of the present invention is summarized as a transmission rate control method in which a radio base station controls a transmission rate of uplink user data to be transmitted from a mobile station, including: determining, at the radio base station, as a maximum granted value that can be notified to the mobile station, a value obtained by multiplying, by a certain number, a current granted value being notified to the mobile station; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

A third aspect of the present invention is summarized as a transmission rate control method in which a radio base station controls a transmission rate of uplink user data to be transmitted from a mobile station, including: determining, at the radio base station, as a maximum granted value that can be notified to the mobile station, a value that is larger by a certain number than a current granted value being notified to the mobile station; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

A fourth aspect of the present invention is summarized as a transmission rate control method in which a radio base station controls a transmission rate of uplink user data to be transmitted from a mobile station, including: determining, at the radio base station, as a maximum granted value that can be notified to the mobile station, a granted value corresponding to an index value that can be obtained by multiplying, by a certain number, an index value corresponding to a current granted value being notified to the mobile station; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

A fifth aspect of the present invention is summarized as a transmission rate control method in which a radio base station controls a transmission rate of uplink user data to be transmitted from a mobile station, including: determining, at the radio base station, as a maximum granted value that can be notified to the mobile station, a granted value corresponding to an index value that is larger, by a certain number, than an index value corresponding to a current granted value being notified to the mobile station; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

A sixth aspect of the invention is summarized as a transmission rate control method in which a radio base station controls a transmission rate of uplink user data to be transmitted from a mobile station, including: determining, at the radio base station, a maximum allowable increment amount for a current granted value being notified to the mobile station, in accordance with a throughput at which the uplink user date transmitted from the mobile station to the radio base station is successfully received at a point of time; calculating, at the radio base station, as an allowable value to be notified to the mobile station, a granted value obtained by increasing the current granted value by an increment amount not more than the maximum allowable increment amount; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

In the aforementioned aspect of the invention, in the determining, the radio base station may determine the maximum granted value, when the radio base station determines to notify, to the mobile station, a granted value larger than the current granted value.

In the aforementioned aspect of the invention, the radio base station may determine not to notify, to the mobile station, the value larger than the current granted value, when a monitoring timer is not terminated.

A seventh aspect of the invention is summarized as a radio base station used in a mobile communication system in which a mobile station transmits uplink user data at a transmission rate corresponding to a granted value notified from the radio base station, including: a granted value determination unit configured to determine a maximum granted value that can be notified to the mobile station, in accordance with a throughput at which uplink user data transmitted from the mobile station to the radio base station is successfully received at a point of time, and to calculate, as an allowable value to be notified to the mobile station, a granted value not more than the maximum granted value; and a granted value notification unit configured to notify, to the mobile station, the granted value calculated by the granted value determination unit, by using a transmission rate control channel.

An eighth aspect of the present invention is summarized as a radio base station used in a mobile communication system in which a mobile station transmits uplink user data at a transmission rate corresponding to a granted value notified from the radio base station, including: a granted value determination unit configured to determine, as a maximum granted value that can be notified to the mobile station, a value obtained by multiplying, by a certain number, a current granted value being notified to the mobile station, and to calculate, as an allowable value to be notified to the mobile station, a granted value not more than the maximum granted value; and a granted value notification unit configured to notify, to the mobile station, the granted value calculated by the granted value determination unit, by using a transmission rate control channel.

A ninth aspect of the present invention is summarized as a radio base station used in a mobile communication system in which a mobile station transmits uplink user data at a transmission rate corresponding to a granted value notified from the radio base station, including: a granted value determination unit configured to determine, as a maximum granted value that can be notified to the mobile station, a value that is larger by a certain number than a current granted value being notified to the mobile station, and to calculate, as an allowable value to be notified to the mobile station, a granted value not more than the maximum granted value; and a granted value notification unit configured to notify, to the mobile station, the granted value calculated by the granted value determination unit, by using a transmission rate control channel.

A tenth aspect of the present invention is summarized as a radio base station used in a mobile communication system in which a mobile station transmits uplink user data at a transmission rate corresponding to a granted value notified from the radio base station, including: a granted value determination unit configured to determine, as a maximum granted value that can be notified to the mobile station, a granted value corresponding to an index value that can be obtained by multiplying, by a certain number, an index value corresponding to a current granted value being notified to the mobile station, and to calculate, as an allowable value to be notified to the mobile station, a granted value not more than the maximum granted value; and a granted value notification unit configured to notify, to the mobile station, the granted value calculated by the granted value determination unit, by using a transmission rate control channel.

An eleventh aspect of the present invention is summarized as a radio base station used in a mobile communication system in which a mobile station transmits uplink user data at a transmission rate corresponding to a granted value notified from the radio base station, including: a granted value determination unit configured to determine, as a maximum granted value that can be notified to the mobile station, a granted value corresponding to an index value that is larger, by a certain number, than an index value corresponding to a current granted value being notified to the mobile station, and to calculate, as an allowable value to be notified to the mobile station, a granted value not more than the maximum granted value; and a granted value notification unit configured to notify, to the mobile station, the granted value calculated by the granted value determination unit, by using a transmission rate control channel.

A twelfth aspect of the present invention is summarized as a radio base station used in a mobile communication system in which a mobile station transmits uplink user data at a transmission rate corresponding to a granted value notified from the radio base station, including: a granted value determination unit configured to determine a maximum allowable increment amount of a current granted value being notified to the mobile station, in accordance with a throughput at which uplink user data transmitted from the mobile station to the radio station is successfully received at a point of time, and to calculate, as an allowable value to be notified to the mobile station, a granted value obtained by increasing the current granted value by an increment amount not more than the maximum allowable increment amount; and a granted value notification unit configured to notify, to the mobile station, the granted value calculated by the granted value determination unit, by using a transmission rate control channel.

In the aforementioned aspect of the invention, the granted value determination unit may determine the maximum allowable increment amount for the current granted value, when the granted value determination unit determines to notify, to the mobile station, a granted value larger than the current granted value.

In the aforementioned aspect of the invention, the granted value determination unit may determine not to notify, to the mobile station, the granted value larger than the current granted value, when a monitoring timer is not terminated.

BRIEF DESCRIPTION OF THE DRAWINGS

FIG. 3 is a view for explaining the uplink transmission rate control method in the mobile communication system according to the conventional technique.

FIG. 4 is a view for explaining the uplink transmission rate control method in the mobile communication system according to the conventional technique.

FIG. 7 is a diagram showing one example of correspondences in "AGs" and "Indexes" defined in 3GPP TS25.212 V7.0.0.

FIG. 8 is a flowchart showing operations of the radio base station according to the first embodiment of the present invention.

FIG. 9 is a diagram showing an example of correspondences between "successfully received transmission rates" and "maximum allowable increment amounts of AG" both stored in a storage unit in a radio base station according to a second embodiment of the present invention.

FIG. 10 is a diagram showing an example of correspondences between "successfully received transmission rates" and "maximum allowable increment amounts of AG" both stored in a storage unit in a radio base station according to a second embodiment of the present invention FIG. 11 is a flowchart showing operations of the radio base station according to the second embodiment of the present invention.

FIG. 12 is a diagram showing an example of correspondences between "current AGs" and "maximum AG values" stored in a storage unit in a radio base station according to a third embodiment of the present invention.

FIG. 13 is a flowchart showing operations of the radio base station according to the third embodiment of the present invention.

FIG. 14 is a diagram showing an example of correspondences between "current AGs" and "maximum AG values" both stored in a storage unit in a radio base station according to a fourth embodiment of the present invention.

FIG. 15 is a flowchart showing operations of the radio base station according to the fourth embodiment of the present invention.

FIG. 16 is a diagram showing an example of correspondences between "current AGs" and "maximum AG values"

both stored in a storage unit in a radio base station according to a fifth embodiment of the present invention.

FIG. 17 is a flowchart showing operations of the radio base station according to the fifth embodiment of the present invention.

FIG. 18 is a diagram showing an example of correspondences between "current AGs" and "maximum AG values" both stored in a storage unit in a radio base station according to a sixth embodiment of the present invention.

Figure 19:
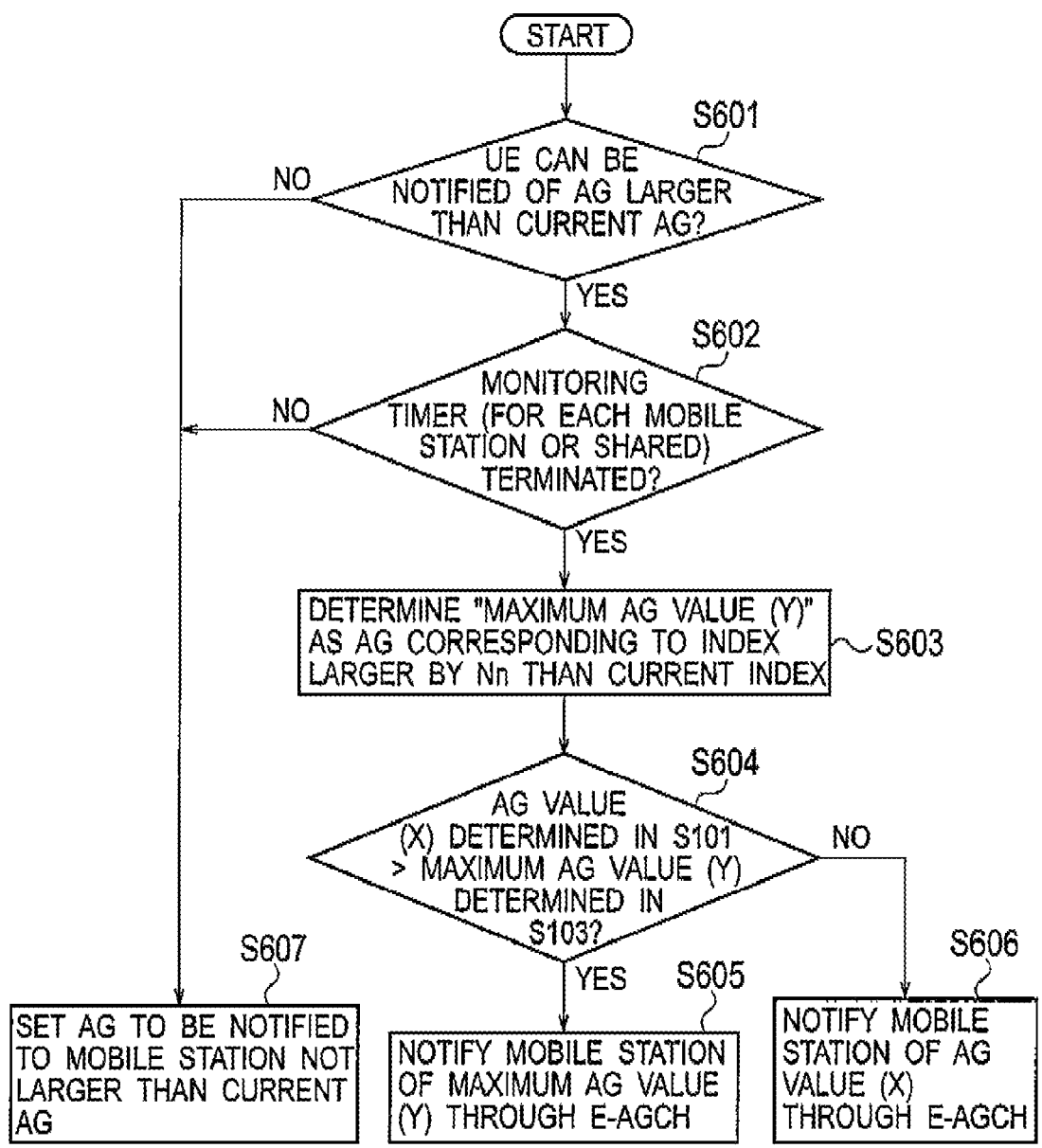

FIG. 19 is a flowchart showing operations of the radio base station according to the sixth embodiment of the present invention.

DETAILED DESCRIPTION OF THE PREFERRED EMBODIMENTS

Configuration of a Mobile Communication System According to a First Embodiment of the Present Invention With reference to FIGS. 5 to 7, description will be given of a configuration of a mobile communication system according to a first embodiment of the present invention.

In the mobile communication system according to this embodiment, each of the mobile station UE is configured to transmit uplink user data at a transmission rate corresponding to an AG (granted value). The AG is notified through an E-AGCH from a radio base station NodeB.

Figure 1:
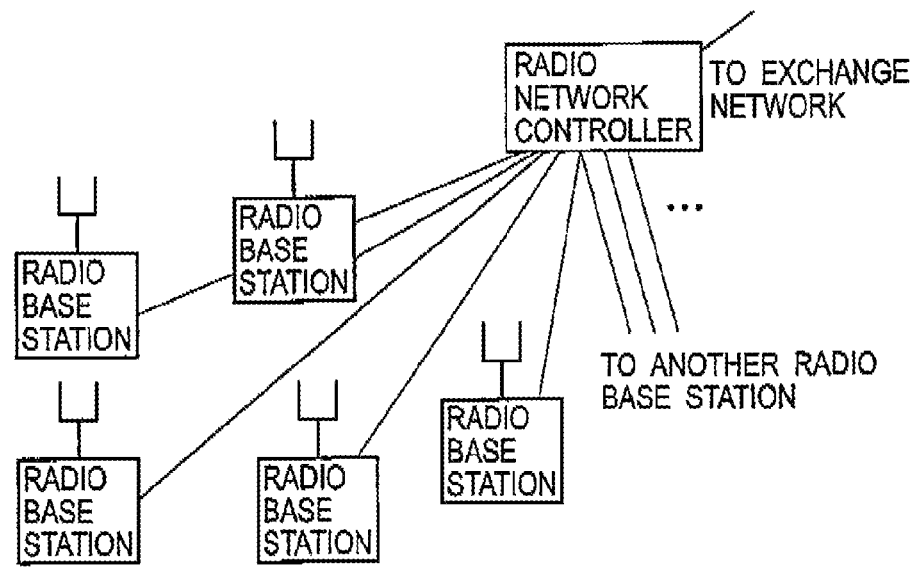
FIG. 1 is an overall configuration diagram of a general mobile communication system.
Figure 2A:
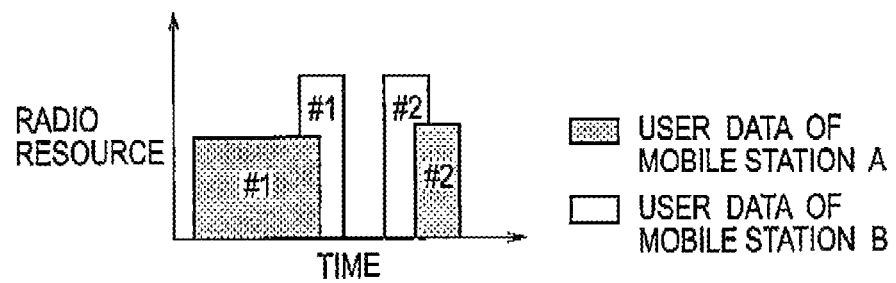
FIG. 2 is a view for explaining an uplink transmission rate control method in a mobile communication system according to a conventional technique.
Figure 2B:
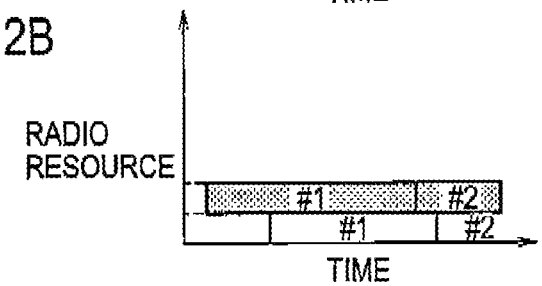
Figure 2C:
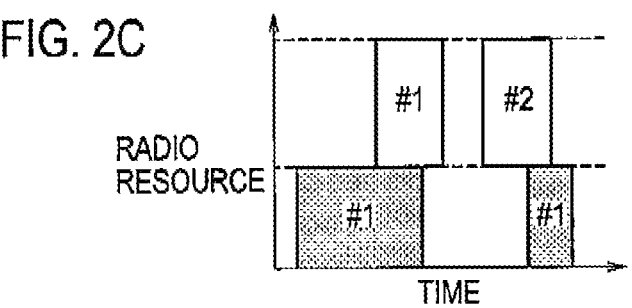
Figures 5, 6:
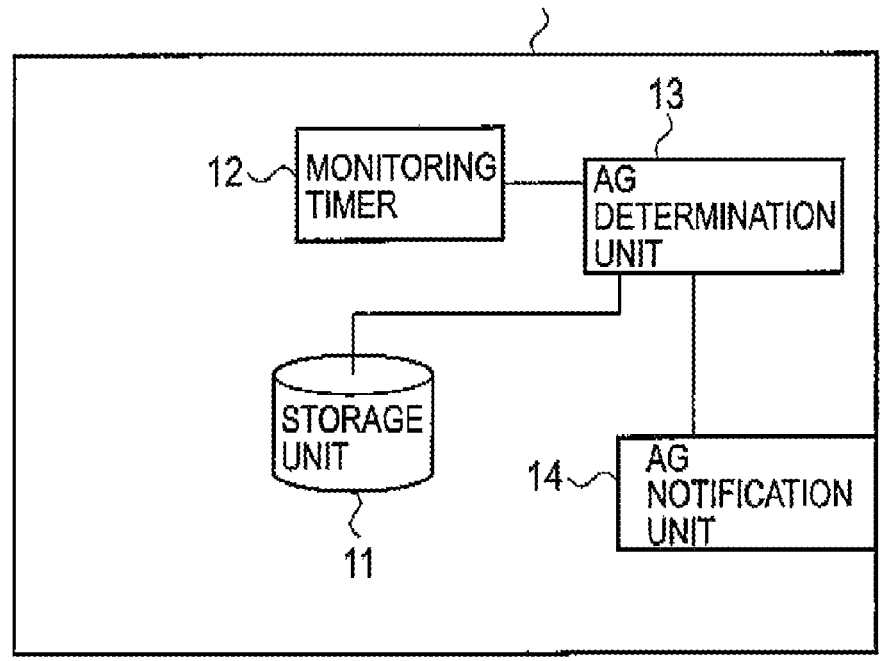
FIG. 5 is a functional block diagram showing a radio base station according to a first embodiment of the present invention.
FIG. 6 is a diagram showing an example of correspondences between "successfully received transmission rates" and "maximum AG values" both stored in a storage unit in the radio base station according to the first embodiment of the present invention

As shown in FIG. 5, the radio base station NodeB according to this embodiment includes a storage unit 11, a monitoring timer 12, an AG determination unit 13 and an AG notification unit 14.

The storage unit 11 is configured to store a "successfully received transmission rate" and a "maximum AG value" in association with each other, as shown in FIG. 6.

Here, the "successfully received transmission rate" indicates a throughput (transmission rate) at which the uplink user data transmitted from the mobile station UE to the radio base station NodeB has been successfully received (that is, a transmission rate of uplink user data to which transmission acknowledged information (ACK/NACK) has been transmitted). Meanwhile, the "maximum AG value" indicates a maximum granted value that can be notified to the mobile station UE.

The monitoring timer 12 is started when a current granted value (AG) assigned to the mobile station UE is increased, and is terminated after a lapse of a predetermined time. The monitoring timer 12 may be provided individually for each mobile station UE or may be shared among multiple mobile stations UE.

The AG determination unit 13 is configured to determine the "maximum AG value (maximum granted value)," in accordance with the throughput (transmission rate) at which the uplink user data is successfully received at the point of the time. Here, the "maximum AG value" is a value that can be notified to each of the mobile station UE. Further, the uplink transmission data is transmitted form the mobile station UE to the radio base station NodeB. Then, the AG determination unit 13 is configured to calculate, as an AG to be notified to the mobile station UE, an AG (granted value) not more than the "maximum AG value (maximum granted value)."

To be more specific, the AG determination unit 13 refers to a correspondence table as shown in FIG. 6, and determines, as the maximum AG value (maximum granted value) that can be notified to each of the mobile stations UE, the "maximum AG value" corresponding to the transmission rate ("successfully received transmission rate") at which the uplink user data is successfully received at the point of the time. Here, the uplink transmission data is transmitted from the mobile station UE to the radio base station.

Then, the AG determination unit 13 determines the AG value (X) that can be notified to the mobile station UE, in consideration of available radio resources and the like. Then, the AG determination unit 13 compares the AG value (X) and the maximum AG value (Y), so as to determine a smaller one to be an AG to be notified to the mobile station UE.

Moreover, the AG determination unit 13 may be configured to determine the maximum AG value (maximum granted value), when the AG determination unit 13 determines to notify the AG granted value) larger than the AG (granted value) currently assigned to the mobile station UE.

Furthermore, the AG determination unit 13 may determine not to notify the AG granted value) larger than the current AG (granted value) notified to the mobile station UE unless the monitoring timer 12 is terminated.

The AG notification unit 14 is configured to notify the calculated AG (granted value) to the mobile station UE by using an E-AGCH (transmission rate control channel).

Specifically, the AG notification unit 14 is configured to transmit, to the mobile station UE, an E-AGCH including "Index" corresponding to the "AG value" calculated as the AG (granted value) to be notified to the mobile station UE. Here, the "AG value" is calculated based on a table associating "Index" with "AG value" shown in FIG. 7 (the table defined in 3GPP TS25.212 V7.0.0.)

Operation of Mobile Communication System According to First Embodiment of the Present Invention Operations of the radio base station NodeB according to the first embodiment of the present invention will be described with reference to FIG. 8.

As shown in FIG. 8, in step S101, in consideration of available radio resources and the like, the radio base station NodeB determines whether or not an AG larger than the currently-notified AG can be notified to the mobile station UE.

When the radio base station NodeB determines the result in Step S101 is positive (YES), in Step S102, the radio base station NodeB determines whether or not the monitoring timer 12 (a monitoring timer for the mobile station or a shared monitoring timer) is terminated.

When the radio base station NodeB determines the result in Step S101 is negative (NO), in Step S107, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S102 is negative (NO), in Step S107, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S102 is positive (YES), in Step S103, the radio base station NodeB determines a maximum AG value (Y) that can be notified to the mobile station UE, in accordance with a throughput (transmission rate) at which the uplink user data is successfully received at the point of the time. In this regard, the uplink transmission data is transmitted from the mobile station UE to the radio base station NodeB.

In Step S104, the radio base station NodeB compares an AG value (X) determined in Step S101 with the maximum AG value (Y) determined in Step S103.

When the AG value (X) is larger than the maximum AG value (Y), in Step S105, the radio base station NodeB notifies, to the mobile station UE, the maximum AG value (Y) through an E-AGCH.

On the other hand, when the AG value (X) is not larger then the maximum AG value (Y), in Step S106, the radio base station NodeB notifies, to the mobile station UE, the AG value (X) through the E-AGCH.

Operations and Effects of Mobile Communication System According to First Embodiment of the Invention The mobile communication system of this embodiment makes it possible to avoid a drastic increase in the transmission power of the E-DPDCH transmitted from the mobile station UE, in a mobile communication system to which an "EUL" method is applied. Accordingly, the mobile communication system according to this embodiment can solve problems caused by such drastic increase in the transmission power of the E-DPDCH.

Moreover, the mobile communication system according to this embodiment enables effective utilization of radio resources by reducing excessively occupied radio resources and by properly securing the radio resources.

Mobile Communication System According to Second Embodiment of Present Invention

A mobile communication system according to a second embodiment of the present invention will be described with reference to FIGS. 9 to 11. Hereinafter, the description will be given mainly for differences between the mobile communication system according to this embodiment and the aforementioned mobile communication system according to the first embodiment.

In this embodiment, a storage unit 11 is configured to store a "successfully received transmission rate" and a "maximum allowable increment amount of AG" in association with each other as shown in FIG. 9.

Here, the "Maximum allowable increment amount of AG" indicates a maximum allowable increment amount for the current granted value (AG) being notified to the mobile station UE. Here, the maximum allowable increment amount may be defined as a difference in the "AGs" in the table shown in FIG. 7, or may be defined as a difference in the "Indexes" in the table shown in FIG. 7

Moreover, an AG determination unit 13 is configured to determine the maximum allowable increment amount (Maximum allowable increment amount of AG) for the current granted value (AG) being notified to a mobile station UE, in accordance with a throughput (transmission rate) at which the uplink user data is successfully received at the point of the time. In this regard, the uplink transmission data is transmitted from the mobile station UE to the radio base station NodeB. Further, the AG determination unit 13 is configured to calculate, as an AG to be notified to the mobile station UE, the AG (granted value) obtained by increasing the current AG (granted value) by an increment amount not more than the maximum allowable increment amount of AG.

To be more specific, as shown in FIG. 9, the AG determination unit 13 determines, as the maximum allowable increment amount (Maximum allowable increment amount of AG) for the current AG (granted value) notified to the mobile station UE, the "maximum AG value" corresponding to the transmission rate ("successfully received transmission rate") at which the uplink user data transmitted from the mobile station UE to the radio base station NodeB is successfully received at the point of the time.

Then, the AG determination unit 13 determines the AG value (X) that can be notified to the mobile station UE, in consideration of the available radio resources and the like. Then, the AG determination unit 13 compares the AG value (X) and the AG value (Y) calculated by increasing the current AG (granted value) by an increment amount not more than the maximum allowable increment amount of AG, so as to determine a smaller one to be an AG to be notified to the mobile station UE.

Here, the AG determination unit 13 is configured to determine, as the maximum AG value, the AG value (Y) not more than the value calculated by increasing the current AG (granted value) by the maximum allowable increment amount of AG, among the AG values in the table shown in FIG. 7.

For example, when the value obtained by increasing the current AG (granted value) by the aforementioned Maximum allowable increment amount of AG in FIG. 7 is "$(100/15)^2$," the AG value (Y) is "$(95/15)^2$."

Here, consider a case where the maximum allowable increment amount (Maximum allowable increment amount of AG) is defined as a difference in the "AGs" in the example shown in FIGS. 7 and 9. Here, when the current AG is "$(11/15)^2$" and the successfully received transmission rate at the point of time is "100 kbps," the value obtained by increasing the current AG (granted value) by the maximum allowable increment amount of AG is "$18.6 \cdots (=\sqrt{(11^2+15^2)}/15)^2$" and the AG value (Y) is "$(15/15)^2$."

On the other hand, consider a case where the maximum allowable increment amount (Maximum allowable increment amount of AG) is defined as the difference in the "Indexes" in the example shown in FIGS. 7 and 9. Here, when the current AG is "$(11/15)^2$" and the successfully received transmission rate at the point of time is "100 kbps," both of the value obtained by increasing the current AG (granted value) by the aforementioned maximum allowable increment amount of AG and the AG value (Y) are "$(15/15)^2$."

Note that, as shown in FIG. 10, the "Maximum allowable increment amount of AGs" corresponding to the "successfully received transmission rates" of "100 kbps" and "300 kbps" may be set at "0." In this case, when the successfully received transmission rate of a mobile station UE at the point of time is smaller than a predetermined threshold ("1 Mbps" in the example in FIG. 10), the AG determination unit 13 may determine not to notify, to the mobile station UE, an AG (granted value) larger than the current AG (granted value)

Moreover, the AG determination unit 13 may be configured to determine the maximum allowable increment amount of AG when an AG (granted value) larger than the current AG (granted value) assigned to the mobile station UE is determined to be notified.

Next operations of the radio base station NodeB according to this embodiment will be described with reference to FIG. 11.

As shown in FIG. 11, in step S201, in consideration of available radio resources and the like, the radio base station NodeB determines whether or not an AG larger than the currently-notified AG can be notified to a mobile station UE.

When the radio base station NodeB determines the result in Step S201 is negative (NO), in Step S207, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S201 is positive (YES), in Step S202, the radio base station NodeB determines whether or not the monitoring timer 12 (a monitoring timer for the mobile station or a shared monitoring timer) is terminated.

When the radio base station NodeB determines the result in Step S202 is negative (NO), in Step S207, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S202 is positive (YES), in Step S203, the radio base station NodeB determines a maximum allowable increment amount for the current AG to be notified to the mobile station, in accordance with the transmission rate ("successfully received transmission rate") at which the uplink user data transmitted from the mobile station UE to the radio base station NodeB is successfully received at the point of the time.

In Step S204, the radio base station NodeB compares an AG value (X) determined in step S201 with the AG value (Y) calculated by increasing the current AG by the maximum allowable increment amount of AG determined in Step S203.

When the AG value (X) is larger than the AG value (Y), in Step S205, the radio base station NodeB notifies, to the mobile station UE, the AG value (Y) through the E-AGCH.

On the other hand, when the AG value (X) is not larger than the AG value (Y), in Step S206, the radio base station NodeB notifies, to the mobile station UE, the AG value (X) through the E-AGCH.

Mobile Communication System According to Third Embodiment of the Present Invention A mobile communication system according to a third embodiment of the present invention will be described with reference to FIGS. 12 and 13. Hereinafter, the description will be given mainly for differences between the mobile communication system according to this embodiment and the aforementioned mobile communication system according to the first embodiment.

In this embodiment, a storage unit 11 is configured to store a "current AG" and a "maximum AG value" in association with each other as shown in FIG. 12.

Moreover, an AG determination unit 13 is configured to determine, as the maximum granted value (maximum AG value) that can be notified to a mobile station UE, a value obtained by multiplying the current granted value (AG) notified to the mobile station UE, by a certain number ($N_n$).

Here, the certain number ($N_n$) may be set at a fixed value, be set to increase as the current granted value (AG) increases, or be set to decrease as the current allow value (AG) increases.

Specifically, the AG determination unit 13 determines, as the maximum AG value (Y) that can be notified to a mobile station UE, the "maximum AG value" corresponding to the "current AG" that indicates the current granted value being notified to the mobile station UE.

Incidentally, in the example in FIG. 12, the "maximum AG value" is defined as the "current AG" times the certain number $N_n$. Here, the certain numbers $N_1$ to $N_{31}$ may take the same value or may take different values.

Then, the AG determination unit 13 determines the AG value (X) that can be notified to the mobile station UE, in consideration of the available radio resources and the like. Then, the AG determination unit 13 compares the AG value (X) and the maximum AG value (Y), so as to determine a smaller one to be an AG to be notified to the mobile station UE.

Here, the AG determination unit 13 is configured to determine, as the maximum AG value, the AG value (Y) not more than the value calculated by increasing the current AG (granted value) by the maximum allowable increment amount of AG, among the AG values in the table shown in FIG. 7.

Next, operations of the radio base station NodeB according to this embodiment will be described with reference to FIG. 13.

As shown in FIG. 13, operations in steps S301 and S302 are the same as those in steps S101 and S102 shown in FIG. 8.

In step S303, the radio base station NodeB determines, as the maximum AG value (Y) that can be notified to the mobile station UE, a value obtained by multiplying the current granted value (AG) notified to the mobile station UE by the certain number ($N_n$). (i.e., an AG $N_n$ times larger than the current AG).

The following operations in steps S304 to S307 are the same as those in steps S104 to S107 shown in FIG. 8.

Mobile Communication System According to Fourth Embodiment of the Present Invention A mobile communication system according to a fourth embodiment of the present invention will be described with reference to FIGS. 14 and 15. Hereinafter, the description will be given mainly for differences between the mobile communication system according to this embodiment and the aforementioned mobile communication system according to the first embodiment.

In this embodiment, a storage unit 11 is configured to store a "current AG" and a "maximum AG value" in association with each other as shown in FIG. 14.

Moreover, an AG determination unit 13 is configured to determine, as the maximum granted value (maximum AG value) that can be notified to the mobile station UE, a value larger by a certain number ($N_n$) than the current granted value (AG) notified to the mobile station UE.

Here, the certain number ($N_n$) may be set at a fixed value, be set to increase as the current granted value (AG) increases, or be set to decrease as the current allow value (AG) increases. In addition, a value larger than or equal to 0 can be used as $N_n$.

Specifically, as shown in FIG. 14, the AG determination unit 13 determines, as the maximum AG value (Y) that can be notified to the mobile station UE, the "maximum AG value" corresponding to the "current AG" indicating the current granted value being notified to the mobile station UE.

Incidentally, in the example in FIG. 14, the "maximum AG value" is defined as the "current AG plus the certain number $N_n$". Here, the certain numbers $N_1$ to $N_{31}$ may take the same value or may take different values.

Then, the AG determination unit 13 determines the AG value (X) that can be notified to the mobile station UE, in consideration of the available radio resources and the like. Then, the AG determination unit 13 compares the AG value (X) and the maximum AG value (Y), so as to determine a smaller one to be an AG to be notified to the mobile station UE.

Here, the AG determination unit 13 is configured to determine, as the maximum AG value, the AG value (Y) not more than the value calculated by increasing the current AG (granted value) by the maximum allowable increment amount of AG, among the AG values in the table shown in FIG. 7.

Hereinafter, operations of the radio base station NodeB according to this embodiment will be described with reference to FIG. 15.

As shown in FIG. 15, operations in steps S401 and S402 are the same as those in steps S101 and S102 shown in FIG. 8.

In step S403, the radio base station NodeB determines, as the maximum AG value (Y) that can be notified to the mobile station UE, a value that is larger by a certain number ($N_n$) than the current granted value (AG) notified to the mobile station UE.

The following operations in steps S404 to S407 are the same as those in steps S104 to S107 shown in FIG. 8.

Mobile Communication System According to Fifth Embodiment of the Present Invention A mobile communication system according to a fifth embodiment of the present invention will be described with reference to FIGS. 16 and 17. Hereinafter, the description will be given mainly for differences between the mobile communication system according to this embodiment and the aforementioned mobile communication system according to the first embodiment.

In this embodiment, a storage unit 11 is configured to store a "current Index" and a "maximum AG value (Index)" in association with each other as shown in FIG. 16.

Here, the "current Index" is an index value (Index) corresponding to the current granted value (AG) being notified to the mobile station UE. Further, the "maximum AG value (Index)" is an index value (Index) corresponding to a maximum granted value (maximum AG value) that can be notified to the mobile station UE.

Moreover, an AG determination unit 13 is configured to determine, as the maximum granted value (maximum AG value) that can be notified to a mobile station UE, the granted value (AG) corresponding to the index value (Index) that can be obtained by multiplying, by a certain number ($N_n$), the index value (Index) corresponding to the current granted value (AG) being notified to the mobile station UE.

Here, the certain number ($N_n$) may be set at a fixed value, be set to increase as the current granted value (AG) increases, or be set to decrease as the current allow value (AG) increases.

Specifically, as shown in FIG. 16, the AG determination unit 13 determines, as the maximum AG value (Y) that can be notified to the mobile station UE, the "maximum AG value (Index)" corresponding to the "current index" that indicates the index value corresponding to the current granted value being notified to the mobile station UE.

Incidentally, in the example in FIG. 16, the "maximum AG value (Index)" is defined as the "current Index" times the certain number $N_n$. Here, the certain numbers $N_1$ to $N_{31}$ may take the same value or may take different values.

Then, the AG determination unit 13 determines the AG value (X) that can be notified to the mobile station UE, in consideration of available radio resources and the like. Then, the AG determination unit 13 compares the AG value (X) and the maximum AG value (Y), so as to determine a smaller one to be an AG to be notified to the mobile station UE.

Hereinafter, operations of the radio base station NodeB according to this embodiment will be described with reference to FIG. 16.

As shown in FIG. 16, operations in steps S501 and S502 are the same as those in steps S101 and S102 shown in FIG. 8.

In step S503, the radio base station NodeB determines, as the maximum granted value (maximum AG value) that can be notified to the mobile station UE, the granted value (AG) corresponding to the index value (Index) that can be obtained by multiplying, by the certain number ($N_n$), the index value (Index) corresponding to the current granted value (AG) being notified to the mobile station UE.

The following operations in steps S504 to S507 are the same as those in steps S104 to S107 shown in FIG. 8.

Mobile Communication System According to Sixth Embodiment of the Present Invention A mobile communication system according to a sixth embodiment of the present invention will be described with reference to FIGS. 18 and 19. Hereinafter, the description will be given mainly for differences between the mobile communication system according to this embodiment and the aforementioned mobile communication system according to the first embodiment.

In this embodiment, a storage unit 11 is configured to store a "current Index" and a "maximum AG value (Index)" in association with each other as shown in FIG. 18.

Here, the "current Index" is an index value (Index) corresponding to the current granted value (AG) being notified to the mobile station UE. Further, the "maximum AG value (Index)" is an index value (Index) corresponding to a maximum granted value (maximum AG value) that can be notified to the mobile station UE.

Moreover, an AG determination unit 13 is configured to determine, as the maximum granted value (maximum AG value) that can be notified to the mobile station UE, the granted value (AG) corresponding to the index value (Index) that is larger, by a certain number ($N_n$), than the index value (Index) corresponding to the current granted value (AG) being notified to the mobile station UE.

Here, the certain number ($N_n$) may be set at a fixed value, be set to increase as the current granted value (AG) increases, or be set to decrease as the current allow value (AG) increases.

Specifically, as shown in FIG. 18, the AG determination unit 13 determines, as the maximum AG value (Y) that can be notified to the mobile station UE, the granted value (AG) corresponding to the "maximum AG value (Index)" corresponding to the "current index" that indicates the index value corresponding to the current granted value being notified to the mobile station UE.

Incidentally, in the example in FIG. 18, the "maximum AG value (Index)" is defined as the "current Index plus the certain number $N_n$". Here, the certain numbers $N_1$ to $N_{31}$ may take the same value or may take different values. In addition, 0 or any positive integer can be used as $N_n$.

Then, the AG determination unit 13 determines the AG value (X) that can be notified to the mobile station UE, in consideration of the available radio resources and the like. Then, the AG determination unit 13 compares the AG value (X) and the maximum AG value (Y), so as to determine a smaller one to be an AG to be notified to the mobile station UE.

Hereinafter, operations of the radio base station NodeB according to this embodiment will be described with reference to FIG. 19.

As shown in FIG. 19, operations in steps S601 and S602 are the same as those in steps S101 and S102 shown in FIG. 8.

In step S603, the radio base station NodeB determines, as the maximum granted value (maximum AG value) that can be notified to the mobile station UE, the granted value (AG) corresponding to the index value (Index) that is larger, by a certain number ($N_n$), than the index value (Index) corresponding to the current granted value (AG) being notified to the mobile station UE.

The following operations in steps S604 to S607 are the same as those in steps S104 to S107 shown in FIG. 8.

Note that the operations of the mobile station UE and radio base station NodeB described above may be implemented by hardware, by a software module executed by a processor, or by a combination of both.

The software module may be provided in any form of storage medium such as a random access memory (RAM), a flash memory, a read only memory (ROM), an erasable programmable ROM (EPROM), an electronically erasable and programmable ROM (EEPROM), a register, a hard disk, a removable disk and a CD-ROM.

Such a storage medium is connected to the processor so that the processor can read and write information from and into the storage medium. Moreover, the storage medium may be integrated in the processor. Furthermore, the storage medium and the processor may be provided in an ASIC. The ASIC may be provided in a mobile station UE and a radio base station eNodeB. Moreover, the storage medium and the processor may be provided as discrete components in the mobile station UE and the radio base station eNodeB.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A transmission rate control method in which a radio base station controls a transmission rate of uplink user data to be transmitted from a mobile station,
   determining, at the radio base station, a first granted value in consideration of available radio resources, when it is determined that a granted value to be notified to the mobile station is larger than the current granted value assigned to the mobile station;
   determining, at the radio base station, a maximum granted value that can be notified to the mobile station, in accordance with a successfully received transmission rate at which the uplink user data is transmitted from the mobile station to the radio base station;
   calculating, at the radio base station, as a second granted value to be notified to the mobile station, the second granted value is not more than the maximum granted value;
   notifying, from the radio base station to the mobile station, a smaller one of the first granted value and the second granted value, by using a transmission rate control channel; and
   transmitting, from the mobile station, the uplink user data, at the transmission rate corresponding to the granted value notified from the radio base station.

2. The transmission rate control method according to claim 1,
   wherein,
   in the determining, the radio base station determines the maximum granted value, when the radio base station determines to notify, to the mobile station, the granted value larger than the current granted value.

3. The transmission rate control method according to claim 2, wherein
   the radio base station determines not to notify, to the mobile station, the granted value larger than the current granted value, when a monitoring timer is not terminated.

4. A transmission rate control method in which a radio base station controls a transmission rate of uplink user data to be transmitted from a mobile station:
   characterized in that
   determining, at the radio base station, a first granted value in consideration of available radio resources, when it is determined that a granted value to be notified to the mobile station is larger than the current granted value assigned to the mobile station;
   determining, at the radio base station, as a maximum granted value that can be notified to the mobile station, a value obtained by multiplying, by a certain number, a current granted value being notified to the mobile station;
   calculating, at the radio base station, as a second granted value to be notified to the mobile station, the second granted value is not more than the maximum granted value;
   notifying, from the radio base station to the mobile station, a smaller one of the first granted value and the second granted value, by using a transmission rate control channel; and
   transmitting, from the mobile station, the uplink user data, at the transmission rate corresponding to the granted value notified from the radio base station.

5. A transmission rate control method in which a radio base station controls a transmission rate of uplink user data to be transmitted from a mobile station:
   characterized in that
   determining, at the radio base station, a first granted value in consideration of available radio resources, when it is determined that a granted value to be notified to the mobile station is larger than the current granted value assigned to the mobile station;
   determining, at the radio base station, as a maximum granted value that can be notified to the mobile station, a value that is larger by a certain number than a current granted value being notified to the mobile station;
   calculating, at the radio base station as a second granted value to be notified to the mobile station, the second granted value is not more than the maximum granted value;
   notifying, from the radio base station to the mobile station a smaller one of the first granted value and the second granted value by using a transmission rate control channel; and
   transmitting, from the mobile station, the uplink user data, at the transmission rate corresponding to the granted value notified from the radio base station.

6. A radio base station used in a mobile communication system in which a mobile station transmits uplink user data at a transmission rate corresponding to a granted value notified from the radio base station:
   a granted value determination unit configured to determine a second granted value that can be notified to the mobile station, in accordance with a successfully received transmission rate at which uplink user data is transmitted from the mobile station to the radio base station, to determine a first granted value in consideration of available radio resources, when it is determined that a granted value to be notified to the mobile station is larger than the currently granted value assigned to the mobile station and to calculate, as a second granted value to be notified to the mobile station, the second granted value is, not more than the maximum granted value; and a granted value notification unit configured to notify, to the mobile station, a smaller one of the first granted value and the second granted value, by using a transmission rate control channel.

7. The radio base station according to claim 6, wherein the granted value determination unit determines the maximum granted value, when the granted value determination unit determines to notify, to the mobile station, a granted value larger than the current granted value.

8. The radio base station according to claim 7, wherein the granted value determination unit determines not to notify, to the mobile station, the granted value larger than the current granted value, when a monitoring timer is not terminated.

9. A radio base station used in a mobile communication system in which a mobile station transmits uplink user data at a transmission rate corresponding to a granted value notified from the radio base station:

characterized in that a granted value determination unit configured to determine, as a maximum granted value that can be notified to the mobile station, a value obtained by multiplying, by a certain number, a current granted value being notified to the mobile station, to determine a first granted value in consideration of available radio resources, when it is determined that a granted value to be notified to the mobile station is larger than the currently granted value assigned to the mobile station and to calculate, as a second granted value to be notified to the mobile station, the second granted value is, not more than the maximum granted value; and a granted value notification unit configured to notify, to the mobile station, a smaller one of the first granted value and the second granted value, granted value determination unit, by using a transmission rate control channel.

10. A radio base station used in a mobile communication system in which a mobile station transmits uplink user data at a transmission rate corresponding to a granted value notified from the radio base station:

characterized in that a granted value determination unit configured to determine, as a maximum granted value that can be notified to the mobile station, a value that is larger by a certain number than a current granted value being notified to the mobile station, to determine a first granted value in consideration of available radio resources, when it is determined that a granted value to be notified to the mobile station is larger than the current granted value assigned to the mobile station and to calculate, as a second granted value to be notified to the mobile station, the second granted value is not more than the maximum granted value; and a granted value notification unit configured to notify, to the mobile station, a smaller one of the first granted value and the second granted value, granted value determination unit, by using a transmission rate control channel.

* * * * *